May 9, 1961 | F. E. ZOGG | 2,983,446

DISTRIBUTOR DEVICE

Filed Dec. 16, 1957 | 2 Sheets-Sheet 1

INVENTOR.
FREDERICK E. ZOGG
BY
Eli Weiss
ATTORNEY

May 9, 1961 F. E. ZOGG 2,983,446

DISTRIBUTOR DEVICE

Filed Dec. 16, 1957 2 Sheets-Sheet 2

INVENTOR.
FREDERICK E. ZOGG
BY
Eli Weiss
ATTORNEY

United States Patent Office 2,983,446

Patented May 9, 1961

2,983,446

DISTRIBUTOR DEVICE

Frederick E. Zogg, Ontario, N.Y., assignor to Burroughs Corporation, Detroit, Mich., a corporation of Michigan Filed Dec. 16, 1957, Ser. No. 703,070

18 Claims. (Cl. 235—61.11)

This invention relates generally to business machines adapted to utilize intelligence bearing media and more particularly to a device that accurately indexes significant areas on a moving record bearing medium.

Each day banking institutions must process large volumes of commercial paper such as checks and the equivalent. To expedite the accurate sorting of this paper by a business machine, code markings are placed on each document. The code markings on the document can be in the form of holes, conductive ink, fluorescent ink, colored ink, magnetic ink or the equivalent to indicate desired information. For example, in checks adapted for automatic processing, information such as amount of check, bank drawn on, and the like can be presented in code form.

Generally one side of the record bearing medium or check is divided into a number of significant areas arranged in parallel rows positioned accurately relative to an edge of the medium. Each significant area in each row represents particular information. The information desired is presented by marking one of the significant areas in one or more of the rows with a hole or a drop of ink. Each significant area is marked in the same manner.

The record bearing medium is driven past a reading head sensitive to the type of marking utilized. Each row of significant areas is scanned serially to generate a signal each time a marked area is sensed. Since each marked significant area generates a pulse signal without any special characteristics the position of the marked significant area must be determined to accurately identify the coded information.

If each significant area in each row is initially positioned accurately with respect to a reference edge of the record bearing medium, then the significant area marked can be indexed by measuring the displacement of the reference edge from the reading head at the instant that the reading head generates a pulse signal.

The utilization of the record bearing medium drive system as a distributor device to accurately index each significant area requires a mechanical or electromechanical coupling structure to pick up and transport the record bearing medium from a stack of records to the drive system to synchronize the start of the record bearing medium through the drive system. In this arrangement the record feed mechanism must be kept in synchronism with the basic timing cycle of the machine. If, however, the desired state of synchronism is not maintained, then, to prevent the generation of spurious results, the advance of the check must be delayed until synchronism with the basic timing cycle is again obtained. This method reduces machine speed and efficiency.

Another method utilizes the making or breaking of an electrical circuit by driving a reference edge of the document between a row of electrical sensing contacts. In indexing the position of thin paper checks and similar media with respect to the reading head, optical sensing devices are more desirable than electrical sensing contacts which may tear or wrinkle the leading edges of the checks. A possible solution to the difficulties caused by sensing brushes would be to place a light source and a number of photoelectric cells in sequence along the path of the checks, so that as a check serially interrupts the light reaching the respective photoelectric cells, each photoelectric cell would generate a pulse which signifies the position of the check. This method, however, would require a photoelectric cell and amplifier for each row of index positions. It also would create difficulties caused by the physical dimensions of photoelectric cells, which must be spaced apart in the direction of check travel by a distance equal to that between adjacent rows of index positions.

It is an object of this invention to provide an improved distributor device that can accurately index discrete areas without exposing the record bearing media to frictional wear or mutilation.

It is also an object of this invention to provide an improved distributor device that is economical to produce and reliable in operation.

Other objects and many of the attendant advantages of this invention will be readily appreciated as the apparatus becomes better understood by reference to the following detailed description when considered in connection with the accompanying drawings wherein.

Similar reference characters refer to similar parts throughout the several views of the drawings.

Figures 1, 2:
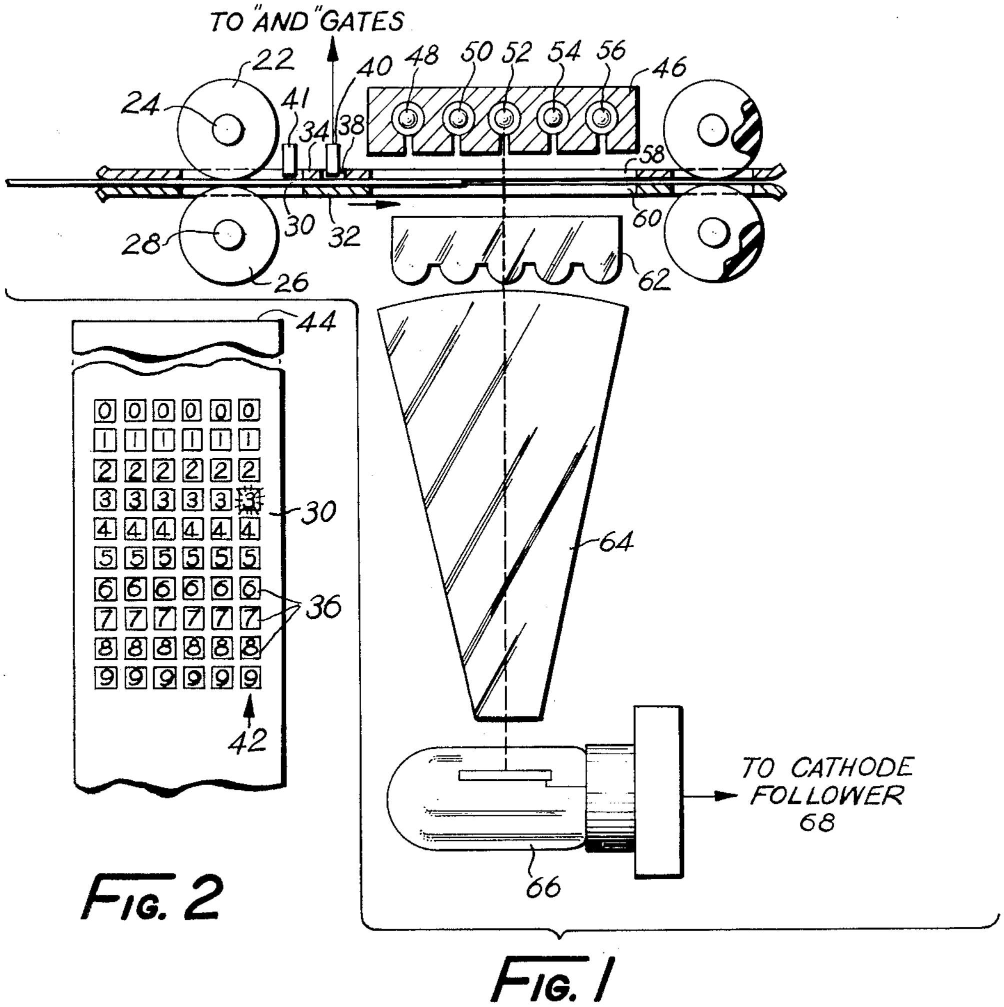
Fig. 1 is a cross sectional view of a count block, and a side view of a lens system and a light sensitive device in accordance with the principles of this invention.
Fig. 2 is a view of one side of a type of record bearing medium.

Briefly, a relatively thin record bearing medium such as a check supports a number of uniformly spaced significant areas arranged one behind another to form a row. Each significant areas represents discrete information required for rapid automatic sorting; i.e., where a personal check is utilized the number of the bank that the check is drawn on, and the like. The required information is presented on one side of the check by marking an appropriate significant area in each row. Thus, the code utilized is of the displacement type wherein particular information is presented by placing a non-distinctive mark in a particular significant area.

When the checks are being sorted, each significant area is serially presented to a reading means. Each time a marked significant area is sensed a signal is generated.

The distributor optically senses a front or rear reference edge of a moving check to accurately index each significant area presented to the reading means. Initially, a first AND gate is enabled or opened to pass a pulse signal only if the first significant area has been marked. As the first significant area of the row moves past the reading means, the front edge of the check begins to pass between an energized first light source and a light sensitive device. At the instant that the light to the light sensitive device is interrupted by the check, a first pulse signal is generated and fed to enable or open a second AND gate to indicate the sensing of a second significant area. If the second significant area is not marked the reading means will not generate a signal and a pulse signal will not pass through the second gate.

The second gate is enabled for a predetermined interval of time starting with the passage of the reference edge of the check between the first light source and the light sensitive device. After a predetermined interval of time sufficient to allow the scanning of the second significant area by the reading means, the second gate is closed, a second source of light positioned ahead of the advancing reference edge of the record bearing medium is activated to illuminate the same light sensitive means and a third AND gate is opened to pass a pulse signal only if the third scanned signficant area has been marked. This procedure is continued until each significant area on the check has been read.

The output signals from the distributor appear in serial form synchronized with the passage of each significant area passed the reading means and sequentially activates a set of AND gates. There is one AND gate for each significant area. The output of the reading means is fed, in parallel, to a second input terminal of each AND gate. In this manner one AND gate is opened at each instant that a distinctive area is sensed by the reading means; however a signal will only pass through an opened AND gate to accurately identify the coded information when a marked significant area is sensed.

The sequential energization and deenergization of the sources of light is continued until each distinctive area is sensed. The marked distinctive area, when sensed, generates a signal that is passed through the AND gate activated. The distributor functions independently of the drive system to index each distinctive area without subjecting the check to possible deformation or tearing.

Referring to Fig. 1, there is disclosed an optical sensing device to index particular areas on a record bearing medium. An idler roller 22 rotatably supported by a shaft 24 is positioned to contact a drive roller 26 rotatably supported by a shaft 28. The drive roller 26 is driven at a constant rate of speed by a motor.

A record bearing medium 30 such as a card or a check is transported to and fed between the two rollers 22 and 26 for movement in the direction indicated by the arrow. A base support member 32 is positioned to receive and support the check as it emerges from between the rollers. A top support member 34 positioned above the base support member a distance slightly greater than the thickness of a check prevents buckling or crimping of the check.

Referring to Fig. 2, there is shown a portion of the front or back of a typical check prepared for the receipt and presentation of code markings to expedite its processing. In this application it shall be asumed that the code markings are on the back of the check however, if desired, the code markings can be placed on the front of the check.

The code markings can be in the form of holes, conductive ink, fluorescent ink, colored ink, magnetic ink, or the equivalent to represent one or more items of information.

The coded information occupies a specific area on a check and, when ink is used it usually occupies a portion of the back of the check. In one arrangement that can be utilized the back of the check 30 is divided into a number of significant areas 36 arranged in parallel rows. Each area represents particular information. For example, the first five rows can be utilized to represent the amount on the face of the check, however, it readily becomes obvious that the significant areas on the back of the check can be utilized to present other desired information.

It should be noted that the presence of a hole or an ink spot in significant area one can not be distinguished from a hole or an ink spot in significant area seven unless an indexing station is provided to index each significant area as it is scanned by a reading means.

The top support member 34 is provided with an elongated slot 38 to facilitate the exposure of a particular row of significant areas to a slidably positioned reading means 40. The type of reading means utilized is dependent upon the type of markings used to indicate a particular significant area. For example, if fluorescent or magnetic ink is utilized an activating source will be required to activate the marked significant areas immediately prior to being presented to the reading means which can be a light sensitive device.

In this embodiment it shall be assumed that one reading means 40 is positioned to scan one row 42 of significant areas at a time in a serial manner. It shall also be assumed that significant area three is marked with magnetic ink and activated prior to being presented to the reading means. In some applications however it may be desirable to scan the rows simultaneously. To accomplish this a separate reading means would be required for each row. In this embodiment however, it shall be assumed that the rows are scanned in their order of appearance and that the first row 42 is serially scanned first for a marked significant area.

The check 30 is fed to and driven by the rollers 22 and 26, leading edge 44 first, and oriented to present the record bearing face to the reading means 40. The reading means 40 and activating device 41 are positioned to serially scan the areas in the first row 42. Located behind the reading means 40 and above the path of travel of the check is a count block 46 that supports five light sources, 48, 50, 52, 54, and 56. Each source of light is enclosed completely by the count block 46 except for a small slit which allows a thin beam of light to be directed downward through two aligned cutouts 58 and 60 in the top support member 34 and the base support member 32 respectively to a light directing means such as a collecting lens 62 and a light directing lens 64. The light directing lens 64 channels the light from the collecting lens 62 to a detection means such as a photomultiplier tube or cell 66.

Each of the light sources can be of the filament type. However, the filament type source of light does not respond very rapidly to an energizing signal because of the time required for the filament to reach its operating temperature after the application of an energizing signal, and the time required for the filament to cool after the removal of the energizing signal. Therefore, if high speed operation of this invention is required a source of light such as a gas filled glow discharge tube number WE–2A capable of responding rapidly to an energizing signal should be utilized.

The count block 46 is positioned to direct the light from each light source downward for sequential interruption by the leading or reference edge 44 of a moving check 30. The distance between adjacent slots in the count block is equal to the spacing between alternate significant areas 36 in the same row 42; and the distance between the first light source 48 and the reading means 40 is substantially equal to the distance between the leading edge 44 and the first appearing or significant area zero 36 on the check 30.

Initially, the first light source 48 is energized and all the other light sources are deenergized; and a first AND gate is enabled or opened to pass a pulse signal if the first appearing or significant area zero is marked when scanned by the reading means 40. As the check is driven forward in the direction indicated by the arrow, and after significant area zero has passed beneath the reading means, the reference edge 44 interrupts the light to the photomultiplier tube 66 from the light source 48 to produce a pulse signal.

Figure 3:
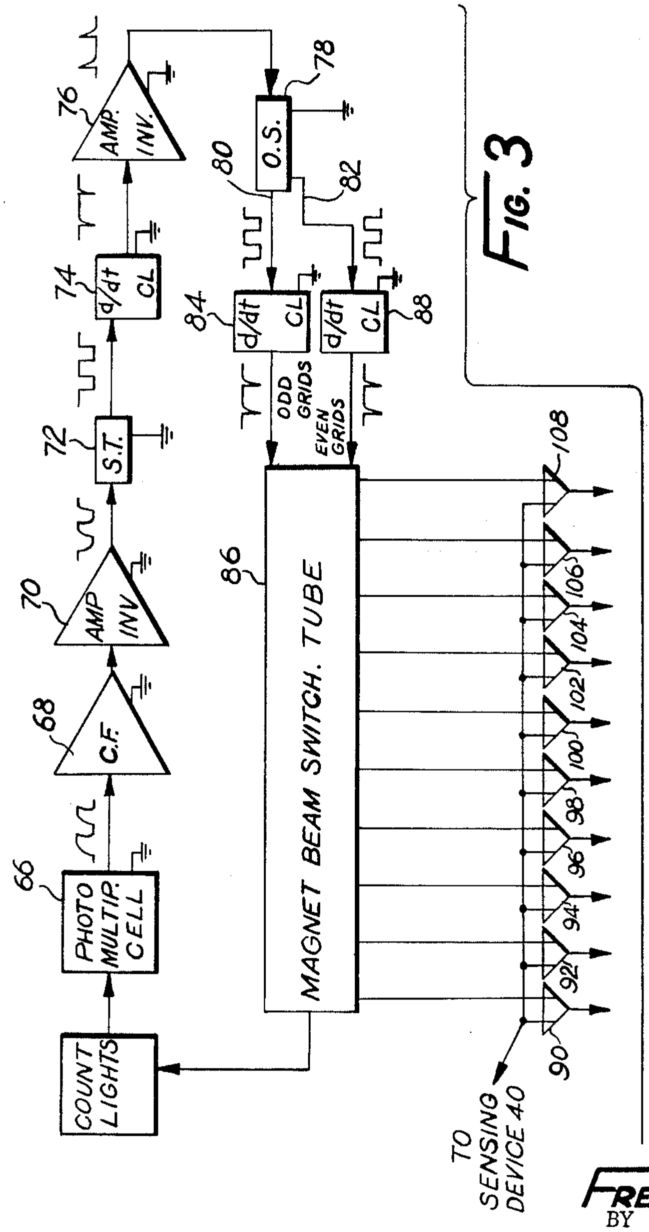
Fig. 3 is a block diagram of the circuit associated with the count block and light sensitive device.

With reference to Fig. 3, the output pulse signal from the photomultiplier tube 66 is fed through a cathode follower 68 to an amplifier inverter 70. The cathode follower 68 prevents loading of the tube 66 and the amplifier inverter 70 amplifies and inverts the signal from the tube 66. The output signal from the amplifier inverter 70 is reshaped by a Schmitt trigger 72, and then differentiated and clipped in a signal shaping means such as a differentiator and clipper network 74. The clipper removes the positive potential spike signals. The output signal from the differentiator and clipper network 74 is fed through a second amplifier inverter 76 to trigger a pulse signal generating means such as a multivibrator 78 of the one-shot type.

The multivibrator 78 generates a first potential output signal on a first terminal 80, and a second potential output signal on a second output terminal 82. The first output signal is one hundred and eighty degrees out of phase with the second output signal. The positive potential spike signal from the amplifier inverter 76 generates a negative potential pulse signal on the terminal 80 and a positive potential pulse signal on the terminal 82. The negative potential pulse signal on the terminal 80 is differentiated and clipped in a differentiator and clipper network 84 to feed a negative potential signal to the odd numbered grids of a switching means such as a magnetron beam switching tube 86 of the type manufactured by the Burroughs Corporation. The Burroughs beam switching tube is a high vacuum device consisting of ten identical positions mounted radially about a central oxide cathode. An axial magnetic field is provided by a small cylindrical magnet which is permanently attached to the glass envelope. Each individual position contains three electrodes which have characteristics capable of forming an electron beam, "automatically" blocking the beam, a constant current output, switching the beam (in many ways), and clearing the electron beam. Thus, the tube may be in a clear or cutoff condition, or an electron beam may be formed in any one of the ten positions and then switched sequentially or at random. The positive potential pulse signal on the terminal 82 is differentiated and clipped in the differentiator and clipper network 88. The output terminal of the network 88 is coupled to the even numbered grids of the magnetron beam switching tube 86. After a predetermined interval of time, determined by the timing cycle of the one-shot multivibrator 78, the multivibrator flops back to its initial state to generate a negative potential spike signal on the output terminal of the differentiator and clipper network 88. At this instant there is no signal present on the output terminal of the differentiator and clipper network 84.

The tube 86 supports internally ten target output plates designated zero, one, two . . . nine in a consecutive manner. Each target output plate designated zero through nine is connected to enable or open a distinctive AND gate, however, those target output plates designated zero, two, four, six, and eight are coupled to also energize the light sources 48, 50, 52, 54, and 56 respectively in the count block 46. Initially, the magnetron beam switching tube 86 is conditioned to energize the first source of light 48. The negative potential spike signal from the differentiator and clipper 84 represents the interruption of light from the light source 48 to the photomultiplier tube 66 by the reference edge 44 of the check 30, and conditions the magnetron beam switching tube 86 to deactivate the output plate designated zero and activate or energize the output plate designated one.

Each output plate of the magnetron beam switching tube 86 is connected to one input terminal of a two input terminal gating means such as an AND gate. The output terminal of the reading means 40 is coupled to the other input terminal of each AND gate. The target output plates of the magnetron beam switching tube designated zero, one, two, three, four, five, six, seven, eight, and nine are coupled to an input terminal of AND gates 90, 92, 94, 96, 98, 100, 102, 104, 106, and 108 respectively.

Thus, when target output plate designated zero is energized, the light source 48 is energized, and the AND gate 90 is enabled or opened to pass a signal generated by the reading means 40. The forward movement of the check positions significant area zero 36 for detection by the reading means 40 immediately prior to the interruption of the light beam from the first light source 48 to the photomultiplier tube 66 by the reference edge 44 of the check 30. For the purpose of this explanation it is assumed that significant area zero has not been marked and, therefore, the reading means 40 will not generate a signal for passage to the output terminal of the AND gate 90. The interruption of the light from the light source 48 to the photomultiplier tube 66 by the reference edge 44 of the advancing check 30 electrically flips the one-shot multivibrator 78 to generate a negative potential spike signal on the output terminal of the network 84 which is fed to the odd numbered grids of the magnetron beam switching tube 86. The signal first de-energizes the energized light source 48 and closes AND gate 90; and then enables or opens AND gate 92.

Immediately after AND gate 92 is opened, significant area one is driven past and sensed by the reading means 40. However, since significant area one has not been marked, the reading means 40 will not generate a signal for passage to the output terminal of AND gate 92. At some instant after significant area one is sensed and prior to the scanning of significant area two, the one-shot multivibrator 78 electrically flops back to its initial state to generate a negative potential spike at the output terminal of the network 88. This signal is fed to the even grids of the magnetron beam switching tube 86 to first close AND gate 92; and then to energize the light source 50 and enable or open AND gate 94.

At some instant prior to the interruption of the beam of light from the light source 50 by the reference edge 44 of the advancing check 30, significant area two is positioned for detection by the reading means 40, however, since this area has not been marked, reading means 40 will not generate a signal for passage through the AND gate 94. Immediately after significant area two is scanned by the reading means 40, the reference edge 44 of the advancing check interrupts the light to the photomultiplier tube 66 from the light source 50; and the one-shot multivibrator 78 is electrically flipped to generate a negative potential pulse signal on the output terminal of the differentiator and clipper network 84. This signal is fed to the odd grids of the magnetron beam switching tube 86 to first de-energize the light source 50 and close AND gate 94; and then to enable or open AND gate 96. At some instant prior to the change of state or electrical flopping of the one-shot multivibrator 78, and the subsequent closing of the gate 96, marked significant area three on the advancing check 30 is driven past the reading means 40 to generate a signal which is fed through the opened or enabled AND gate 96. The signal from the AND gate 96 is utilized to activate appropriate sorting means to direct the check to an appropriate storage bin.

At some time after significant area three has been scanned and prior to the scanning of the significant area four, the one-shot multivibrator 78 electrically flops back to its initial state to generate a negative pulse that passes through the network 88 to the even grids of the magnetron beam switching tube 86 to first close AND gate 96; and then open AND gate 98, and activate light source 52.

The sequential energization and de-energization of the light sources is continued at a rate dictated by the speed of advance of the check; and the sequential opening and closing of the AND gates is controlled by the speed of advance of the check and the period of operation of the one-shot multivibrator 78.

The magnetron beam switching tube 86 continues to open and close the AND gates, and to energize and de-energize the sources of light until the last AND gate 108 is closed, at which time the light source 48 is again energized and the system is in condition for the receipt and detection of a marked significant area on a new check.

It should be noted that the light sources are utilized to index every other area 36 by detecting the leading or reference edge of the check, and that the timing cycle of the one-shot multivibrator is utilized to anticipate the position of the other alternate significant areas 36 relative to the reading means 40. The utilization of this procedure allows the accurate detection of areas that are positioned closer together than the physical dimensions of the light sources allow.

In some applications it may be desirable to utilize the trailing edge of a record bearing document as the reference edge.

In other applications it may be desirable to utilize a light source, in cooperation with the leading edge 44 of the check, to index each significant area 36 rather than every other area.

Figure 5:
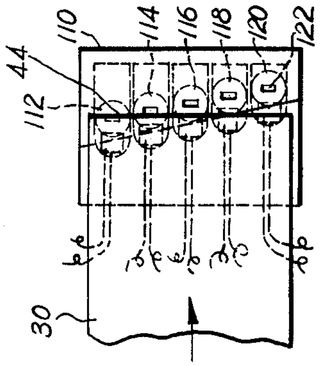
Fig. 5 is a view in the direction indicated by the line 5—5 of Fig. 4.
Figure 4:
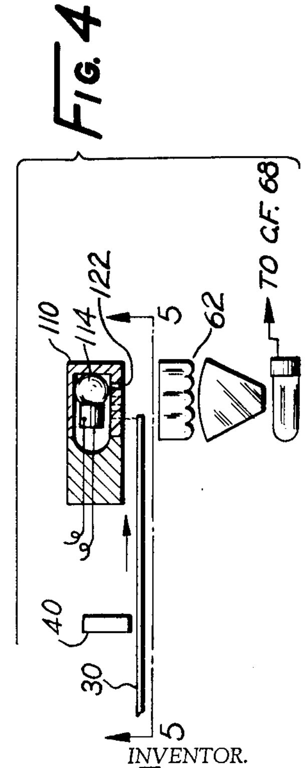
Fig. 4 is another embodiment of a count block in accordance with the principles of this invention.

With reference to Figs. 4 and 5, there is disclosed a count block that supports light sources arranged to index each significant area. The count block 110 supports a number of light sources 112, 114, 116, 118, and 120 staggered relative to each other to form a row positioned obliquely to the direction of travel of the check. A small slit 122 located directly beneath each lamp directs a small beam of light downward towards a photomultiplier cell through a lens system. The slits are staggered along the direction of travel of the check to present small beams of light each displaced from the reading means 40 by a predetermined distance without limitation to the physical dimensions of the light sources. In this embodiment, light sources can be utilized to index directly significant areas positioned close to each other. Additional significant areas can be indexed by providing additional light sources to those illustrated in Figs. 4 and 5 or, if the document is not wide enough to accommodate more light sources, then by adding a second row of staggered light sources obliquely positioned immediately behind the first row of staggered light sources. Where the light sources are utilized to index each significant area, then each target output plate of the magnetron beam switching tube is connected to a light source and to an AND gate; the amplifier inverter 76, multivibrator 78, and differentiator and clipper networks 84 and 88 are no longer required, and the magnetron beam switching tube is connected to step one position each time it receives a pulse signal from the differentiator and clipper network 74.

Obviously many modifications and varations of the presented invention are possible in the light of the above teachings. It is therefore to be understood that within the scope of the appended claims the invention may be practiced otherwise than as specifically described.

What is claimed is:

1. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of optical sensing means displaced along the path of travel of said record bearing medium, and switching means responsive to the sensing of a predetermined edge of said record bearing medium by an optical sensing means to activate a next appearing optical sensing means.

2. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, detection means responsive to the displacement of a predetermined edge of said record bearing medium past an energized light source, and switching means coupled to said detection means to energize a next appearing light source.

3. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, detection means responsive to the displacement of a predetermined edge of said record bearing medium past an energized light source, switching means coupled to said detection means to energize a next appearing light source, and gating means conditioned by said switching means to identify the significant area sensed by said reading means.

4. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, a photomultiplier tube positioned to detect the displacement of a predetermined edge of said record bearing medium past an energized light source, a magnetic beam switching tube fed by said photomultiplier tube to energize a next appearing light source, and gating means responsive to said magnetic beam switching tube to identify the significant area sensed by said reading means.

5. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, switching means to energize sequentially said plurality of light sources, detection means positioned to detect the displacement of a predetermined edge of said record bearing medium past an energized light source, and signal shaping means responsive to said detection means coupled to advance said switching means when said predetermined edge of said record bearing medium passes an energized light source.

6. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, a magnetic beam of switching tube to energize sequentially said plurality of light sources, a photomultiplier tube to detect the displacement of a predetermined edge of said record bearing medium past an energized light source, signal shaping means responsive to said photomultiplier tube to advance said magnetic beam switching tube when said predetermined edge of said record bearing medium passes an energized light source, and gating means responsive to said magnetic beam switching tube to identify the significant area sensed by said reading means.

7. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, switching means to energize sequentially said plurality of light sources, detection means positioned to detect the displacement of a predetermined edge of said record bearing medium past an energized light source, and pulse signal generating means responsive to said detection means to advance said switching means when said predetermined edge of said record bearing medium passes an energized light source.

8. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, a magnetic beam switching tube to energize sequentially said plurality of light sources, a photomultiplier tube positioned to detect the displacement of a predetermined edge of said record bearing medium past an energized light source, pulse signal generating means responsive to said photomultiplier tube to advance said magnetic beam switching tube when said predetermined edge of said record bearing medium passes an energized light source, and gating means responsive to each position of said magnetic beam switching tube to identify each significant area sensed by said reading means.

9. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, switching means to energize sequentially said plurality of light sources, detection means positioned to detect the displacement of a predetermined edge of said record bearing medium past an energized light source, signal shaping means fed by said detection means, and pulse signal generating means responsive to said signal shaping means to advance said switching means when said predetermined edge of said record bearing medium passes an energized light source.

10. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, a magnetic beam switching tube to energize sequentially said plurality of light sources, a photomultiplier tube positioned to detect the displacement of a predetermined edge of said record bearing medium past an activated light source, signal shaping means fed by said photomultiplier tube, pulse signal generating means responsive to said signal shaping means to advance said magnetic beam switching tube when said predetermined edge of said record bearing medium passes an energized light source, and gating means responsive to each position of said magnetic beam switching tube to identify each significant area sensed by said reading means.

11. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, switching means to energize sequentially said plurality of light sources, detection means positioned to detect the displacement of a predetermined edge of said record bearing medium past an energized light source, a differentiator network fed by said detection means, and pulse generating means responsive to said differentiator network to advance said switching means when said predetermined edge of said record bearing medium passes an energized light source.

12. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, a magnetic beam switching tube to energize sequentially said plurality of light sources, a photomultiplier tube positioned to detect the displacement of a predetermined edge of said record bearing medium past an energized light source, a differentiator network fed by said photomultiplier tube, pulse signal generating means responsive to said differentiator network to advance said magnetic beam switching tube when said predetermined edge of said record bearing medium passes an energized light source, and gating means responsive to each position of said magnetic beam switching tube to identify each significant area sensed by said reading means.

13. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, switching means to energize sequentially said plurality of light sources, detection means positioned to detect the displacement of a predetermined edge of said record bearing medium past an energized light source, a differentiator network fed by said detection means, and a multivibrator responsive to said differentiator network to advance said switching means when said predetermined edge of said record bearing medium passes an energized light source.

14. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, a magnetic beam switching tube to energize sequentially said plurality of light sources, a photomultiplier tube positioned to detect the displacement of a predetermined edge of said record bearing medium past an energized light source, a differentiator network fed by said photomultiplier tube, a multivibrator responsive to said differentiator network to advance said magnetic beam switching tube a group of positions when said predetermined edge of said record bearing medium passes an energized light source, and gating means responsive to each position of said magnetic beam switching tube to identify each significant area sensed by said reading means.

15. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, switching means to energize sequentially said plurality of light sources, detection means positioned to detect the displacement of a predetermined edge of said record bearing medium past an energized light source, a differentiator and clipper network fed by said detection means, and a one-shot multivibrator responsive to said differentiator and clipper network to step said switching means two positions to energize a next appearing light source when said predetermined edge of said record bearing medium passes an energized light source.

16. In an analyzing device adapted to utilize a record bearing medium that supports a row of significant areas; a reading means; drive means for moving said record bearing medium past said reading means; an indexing station for sensing the displacement of said record bearing medium from a reference position comprising a plurality of light sources displaced along the path of travel of said record bearing medium; switching means to energize sequentially said plurality of light sources; detection means positioned to detect the displacement of a predetermined edge of said record bearing medium past an energized light source; light directing means interposed between said plurality of light sources and said detection means; a first differentiator and clipper network fed by said detection means; a one-shot multivibrator activated by said first differentiator and clipper network; and a second differentiator and clipper network fed by said one-shot multivibrator to advance said switching means a first position to de-energize the energized light source and then a second position to energize a next appearing light source, said first position indicating the reading of one significant area and said second position indicating the reading of another significant area.

17. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, switching means to energize sequentially said plurality of light sources, detection means positioned to detect the displacement of a predetermined edge of said record bearing medium past an energized light source, light directing means interposed between said plurality of light sources and said detection means, a Schmitt trigger coupled to receive and improve the wave form of the signal from said detection means, a first differentiator and clipper network fed by said Schmitt trigger, a one-shot multivibrator having a first and second output terminal activated by said first differentiator and clipper network, a second differentiator and clipper network fed by said first output terminal of said one-shot multivibrator to advance said switching means one position to de-energize the energized light source, third differentiator and clipper network fed by said second output terminal of said one-shot multivibrator to advance said switching means another position to energize a next appearing light source prior to the passage of the predetermined edge of said record bearing medium past said next appearing light source.

18. In an analyzing device adapted to utilize a record bearing medium that supports a row of significant areas, a reading means, drive means for moving said record bearing medium past said reading means, an indexing station for sensing the displacement of said record bearing medium from a reference position comprising a plurality of light sources displaced along the path of travel of said record bearing medium, a magnetic beam switching tube to energize sequentially said plurality of light sources, a photomultiplier tube positioned to detect the displacement of a predetermined edge of said record bearing medium past an energized light source, light directing means interposed between said plurality of light sources and said photomultiplier tube, a Schmitt trigger coupled to receive and improve the wave form of the signal from said photomultiplier tube, a first differentiator and clipper network fed by said Schmitt trigger, a one-shot multivibrator having a first and a second output terminal activated by said first differentiator and clipper network, a second differentiator and clipper network fed by said first output terminal of said one-shot multivibrator to advance said magnetic beam switching tube one position to de-energize the energized light source, a third differentiator and clipper network fed by said second output terminal of said one-shot multivibrator to advance said magnetic beam switching tube another position to energize a next appearing light source prior to the passage of the predetermined edge of said record bearing medium past said next appearing light source.

References Cited in the file of this patent

UNITED STATES PATENTS 2,731,200 Koelsch -------------- Jan. 17, 1956